(12) United States Patent
Wu et al.

(10) Patent No.: US 11,558,094 B2
(45) Date of Patent: Jan. 17, 2023

(54) INFORMATION TRANSMISSION AND RECEIVING METHOD AND DEVICE, STORAGE MEDIUM AND ELECTRONIC DEVICE

(71) Applicant: ZTE Corporation, Guangdong (CN)

(72) Inventors: Hao Wu, Shenzhen (CN); Yu Ngok Li, Shenzhen (CN); Zhaohua Lu, Shenzhen (CN); Yijian Chen, Shenzhen (CN); Xianghui Han, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/925,658

(22) Filed: Jul. 10, 2020

(65) Prior Publication Data

US 2020/0343959 A1  Oct. 29, 2020

Related U.S. Application Data

(63) Continuation of application No. PCT/CN2019/071103, filed on Jan. 10, 2019.

(30) Foreign Application Priority Data

Jan. 12, 2018 (CN) .......................... 201810031249.7

(51) Int. Cl.
*H04W 72/04* (2009.01)
*H04B 7/06* (2006.01)
(Continued)

(52) U.S. Cl.
CPC ......... *H04B 7/0626* (2013.01); *H04B 7/0639* (2013.01); *H04L 1/0004* (2013.01);
(Continued)

(58) Field of Classification Search
CPC ... H04B 7/0626; H04B 7/0639; H04L 1/0004; H04L 1/0013; H04L 1/1819;
(Continued)

(56) References Cited

U.S. PATENT DOCUMENTS

| 10,735,073 | B2* | 8/2020 | Kim | ...................... H04L 1/1671 |
|---|---|---|---|---|
| 2011/0319068 | A1* | 12/2011 | Kim | ...................... H04L 5/0053 |
| | | | | 455/422.1 |

(Continued)

FOREIGN PATENT DOCUMENTS

| CN | 104429015 A | 3/2015 |
|---|---|---|
| CN | 106067845 A | 11/2016 |

(Continued)

OTHER PUBLICATIONS

R1-1719571, Discussion on separate UCI encoding for long-PUCCH, MediaTek Inc., Nov. 27-Dec. 1, 2017 (Year: 2017).*

(Continued)

*Primary Examiner* — Mahbubul Bar Chowdhury
(74) *Attorney, Agent, or Firm* — Foley & Lardner LLP

(57) ABSTRACT

Provided are an information transmission and receiving method and device, a storage medium and an electronic apparatus. The information transmission method includes: transmitting at least two pieces of the following information in a multiplexing manner on a physical channel: channel state information (CSI), first control information or data information. The first control information includes at least one of: hybrid automatic retransmission request acknowledgement (HARQ-ACK) information or scheduling request (SR) information.

17 Claims, 3 Drawing Sheets

(51) Int. Cl.
*H04L 1/00* (2006.01)
*H04L 1/18* (2006.01)
*H04L 5/00* (2006.01)
*H04W 72/12* (2009.01)

(52) U.S. Cl.
CPC .......... *H04L 1/0013* (2013.01); *H04L 1/1819* (2013.01); *H04L 5/0055* (2013.01); *H04W 72/0413* (2013.01); *H04W 72/1263* (2013.01)

(58) Field of Classification Search
CPC ... H04L 5/0055; H04L 5/0053; H04L 5/0057; H04W 72/0413; H04W 72/1263
See application file for complete search history.

(56) References Cited

U.S. PATENT DOCUMENTS

| | | | |
|---|---|---|---|
| 2013/0100911 A1* | 4/2013 | Lv | H04L 1/0073 370/329 |
| 2014/0112300 A1* | 4/2014 | Han | H04N 21/25825 370/329 |
| 2014/0233419 A1 | 8/2014 | Cheng et al. | |
| 2017/0006491 A1* | 1/2017 | Chen | H04L 1/1861 |
| 2017/0041923 A1 | 2/2017 | Park | |
| 2017/0332374 A1* | 11/2017 | Koorapaty | H04L 1/1812 |
| 2018/0167932 A1* | 6/2018 | Papasakellariou | H04L 5/0055 |
| 2018/0212718 A1* | 7/2018 | Takeda | H04L 5/0057 |
| 2018/0352545 A1* | 12/2018 | Takeda | H04L 1/0081 |
| 2020/0120706 A1* | 4/2020 | Sun | H04L 5/0007 |
| 2020/0228250 A1* | 7/2020 | Cheng | H04L 1/1819 |
| 2021/0044409 A1* | 2/2021 | Davydov | H04L 5/006 |

FOREIGN PATENT DOCUMENTS

| | | |
|---|---|---|
| CN | 107409321 A | 11/2017 |
| CN | 107534965 A | 1/2018 |
| CN | 108259154 A | 7/2018 |
| WO | WO-2016/163855 A1 | 10/2016 |
| WO | WO-2017/142581 A1 | 8/2017 |
| WO | WO-2017/187810 A1 | 11/2017 |

OTHER PUBLICATIONS

First CN Office Action on CN 201810031249.7 dated Mar. 25, 2021 (17 pages, including English translation).
Huawei et al., "CSI feedback for Type 1 codebook", 3GPP TSG WG1 Meeting #90, R1-1713763, Prague, Czech Republic, Aug. 21-25, 2017 (6 pages).
International Search Report for PCT Appl. No. PCT/CN2019/071103 dated Mar. 29, 2019, (7 Pages with English Translation).
Extended European Search Report on EP 19738790.5 dated Feb. 3, 2021 (10 pages).
Samsung: "CSI Reporting and UCI multiplexing", 3GPP TSG RAN WG1 Meeting #90, 3GPP Draft; RI-1713589; Prague, P.R. Czechia, Aug. 20, 2017 (4 pages).

* cited by examiner

Acquire at least two pieces of information in the following information: CSI, first control information or data information, where the first control information includes at least one of: hybrid automatic retransmission request acknowledgement (HARQ-ACK) information or scheduling request (SR) information — S202

Transmit the acquired at least two pieces of information in a multiplexing manner on a physical channel — S204

FIG. 3

Receive at least two pieces of information in the following information transmitted in a multiplexing manner on a physical channel: CSI, first control information or data information, where the first control information includes at least one of: hybrid automatic retransmission request acknowledgement (HARQ-ACK) information or scheduling request (SR) information — S302

FIG. 4

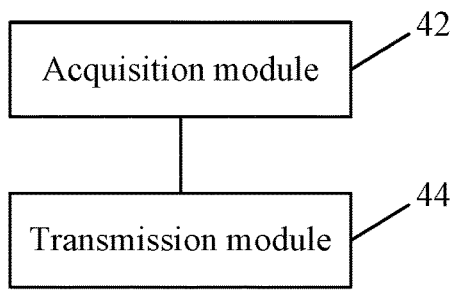

FIG. 5

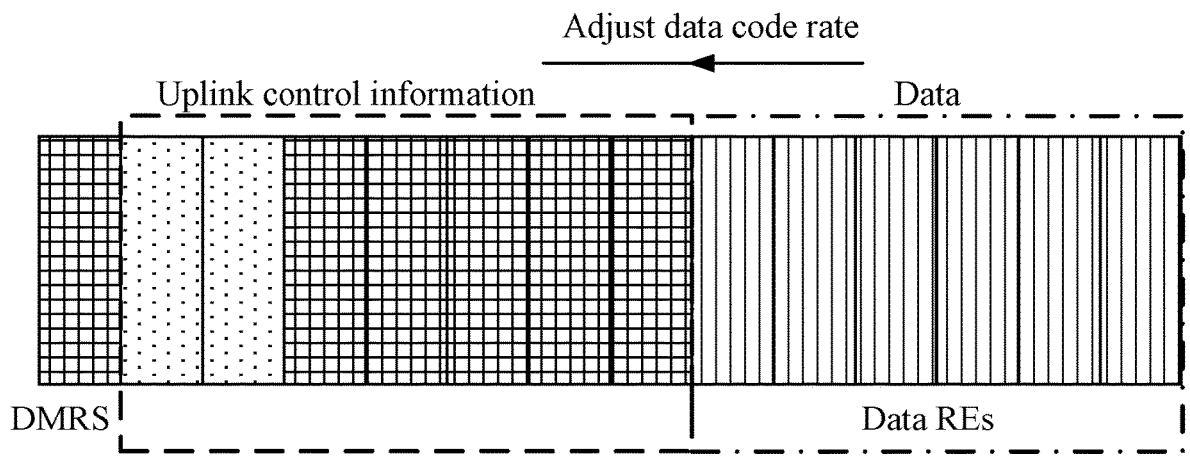

FIG. 6

INFORMATION TRANSMISSION AND RECEIVING METHOD AND DEVICE, STORAGE MEDIUM AND ELECTRONIC DEVICE

CROSS-REFERENCE TO RELATED APPLICATIONS

This application claims the benefit of priority under 35 U.S.C. § 120 as a continuation of PCT Patent Application No. PCT/CN2019/071103, filed on Jan. 10, 2019, which claims priority to Chinese patent application No. 201810031249.7, filed on Jan. 12, 2018, the disclosure of each of which is incorporated herein by reference in its entirety.

TECHNICAL FIELD

The present application relates to the field of communications and, for example, to an information transmission and receiving method and device, a storage medium and an electronic device.

BACKGROUND

In a wireless communication system, a transmitting end and a receiving end generally use multiple antennas for transmission and reception to obtain a higher communication rate. One principle of the multiple-input-multiple-output (MIMO) technology is to utilize some channel characteristics to form multi-layer transmission that matches the channel characteristics, so that effectively improving system performance is effectively improved, and the significant improvement on the system performance is achieved without increasing a bandwidth and power. Generally speaking, a complete channel state information (CSI) includes a rank indicator (RI), a precoding matrix indicator (PMI), and a channel quality indicator (CQI) or a channel resource indicator (CRI). In a wireless system, the CSI is transmitted as a type of uplink control information (UCI), which can be transmitted on a physical uplink control channel (PUCCH) or on a physical uplink shared channel (PUSCH). In addition to the CSI, the UCI may also include hybrid automatic repeat request-acknowledge (HARQ-ACK) information and/or scheduling request (SR) information, where an ACK/NACK feedback is transmitted in the HARQ-ACK information, a scheduling request of the terminal is transmitted in the SR information.

In the related art, the terminal encodes and transmits the CSI through two modes. In a first mode, the channel encoding and transmission are performed on all CSI parameters in a CSI report. In a second mode, the CSI report is divided into two parts. The two parts are encoded and reported separately. In the two modes, there is no effective solution for multiplexing, encoding and transmitting the CSI and data information or the CSI and other UCI in the related art.

SUMMARY

Embodiments of the present disclosure provide an information transmission and receiving method and device, a storage medium and an electronic apparatus to at least solve the problem of low transmission efficiency of control information and data information in the related art. According to an embodiment of the present disclosure, an information transmission method is provided. The method includes: transmitting at least two pieces of the following information in a multiplexing manner on a physical channel: channel state information (CSI), first control information or data information; where the first control information includes at least one of: hybrid automatic retransmission request acknowledgement (HARQ-ACK) information or scheduling request (SR) information.

According to an embodiment of the present disclosure, an information receiving method is provided. The method includes: receiving at least two pieces of the following information transmitted in a multiplexing manner on a physical channel: channel state information, first control information or data information; where the first control information includes at least one of: hybrid automatic retransmission request acknowledgement (HARQ-ACK) information or scheduling request (SR) information.

According to an embodiment of the present disclosure, an information transmission device is provided. The device includes: a transmission module, which is configured to receive at least two pieces of the following information transmitted in a multiplexing manner on a physical channel: channel state information, first control information or data information; where the first control information includes at least one of: hybrid automatic retransmission request acknowledgement (HARQ-ACK) information or scheduling request (SR) information.

According to an embodiment of the present disclosure, an information receiving device is provided. The device includes: a receiving module, which is configured to receive at least two pieces of the following information transmitted in a multiplexing manner on a physical channel: channel state information, first control information or data information; where the first control information includes at least one of: hybrid automatic retransmission request acknowledgement (HARQ-ACK) information or scheduling request (SR) information.

According to another embodiment of the present disclosure, a computer-readable storage medium is further provided and is configured to store computer programs, where when the computer programs are executed, steps of any one of the above method embodiments are performed.

According to another embodiment of the present disclosure, an electronic apparatus is further provided. The electronic apparatus includes a memory and a processor. The memory is configured to store computer programs and the processor is configured to run the computer programs for performing the steps of any one of the above method embodiments. Through the present disclosure, since at least two pieces of the following information are transmitted in the multiplexing manner on a physical channel: the CSI, the first control information and the data information, i.e., transmitting the data information and the second control information (including the CSI and/or the first control information) in the multiplexing manner or transmitting the CSI and the first control information in the multiplexing manner on a physical channel, so that the transmission efficiency of the control information and the data information may be increased, and the problem of low transmission efficiency of the control information and the data information in the related art may be solved.

BRIEF DESCRIPTION OF DRAWINGS

FIG. 3 is a flowchart of an information transmission method according to an embodiment of the present disclosure;

FIG. 4 is a flowchart of an information receiving method according to an embodiment of the present disclosure;

FIG. 5 is a block diagram of an information transmission device according to an embodiment of the present application;

FIG. 6 is a schematic diagram of adjusting a data code rate according to exemplary embodiment two of the present application;

DETAILED DESCRIPTION

The present application will be described hereinafter in detail with reference to the drawings and in conjunction with embodiments. It is to be noted that if not in collision, the embodiments described herein and the features in the embodiments may be combined with each other.

It is to be noted that the terms "first", "second" and the like in the description, claims and drawings of the present application are used to distinguish between similar objects and are not necessarily used to describe a particular order or sequence.

Embodiment One

Figure 1:
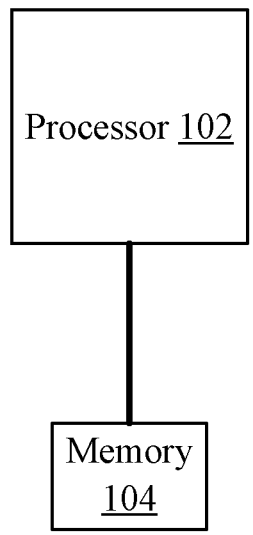
FIG. 1 is a block diagram showing hardware structures of a mobile terminal of an information transmission method according to an embodiment of the present application.

A method embodiment provided by the embodiment one of the present application may be executed on an electrical apparatus, such as a mobile terminal, a computer terminal or other similar computing apparatuses. Taking the method to be executed by the mobile terminal as an example, FIG. 1 is a block diagram showing hardware structures of a mobile terminal for an information transmission method according to an embodiment of the present application. As shown in FIG. 1, a mobile terminal 10 may include one or more (only one is shown in FIG. 1) processors 102 (the processor 102 may include, but is not limited to, a processing apparatus such as a micro-controller unit (MCU) or a field-programmable gate array (FPGA)), a memory 104 used for storing data.

Figure 2:
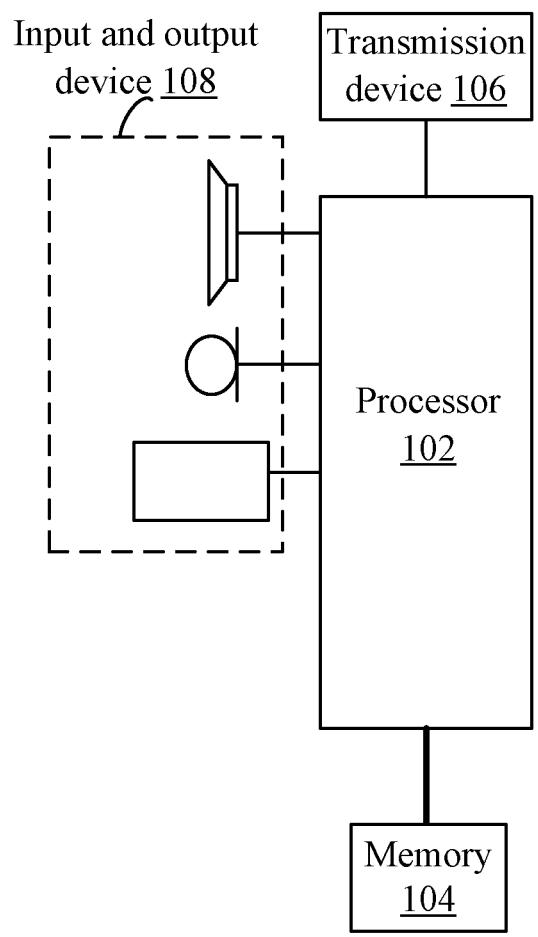
FIG. 2 is another block diagram showing hardware structures of a mobile terminal of an information transmission method according to an embodiment of the present application.

As shown in FIG. 2, optionally, the mobile terminal may further include a transmission device 106 for a communication function and an input and output device 108. It is to be understood by those skilled in the art that the structure shown in FIGS. 1 and 2 is merely illustrative and not intended to limit the structure of the preceding mobile terminal. For example, the mobile terminal 10 may further include more or fewer components than the components shown in FIGS. 1 and 2 or may have a configuration different from the configuration shown in FIGS. 1 and 2.

The memory 104 may store computer programs, such as modules and software programs of application software, such as computer programs corresponding to the information transmission method in the embodiment of the present application. The processor 102 executes various functional applications and data processing by running the computer programs stored in the memory 104, i.e., to implement the above-mentioned method. The memory 104 may include a high-speed random access memory, and may further include a nonvolatile memory, such as one or more magnetic storage apparatuses, flash memories or other nonvolatile solid-state memories. In some examples, the memory 104 may further include memories which are remotely configured with respect to the processor 102. These remote memories may be connected to the mobile terminal 10 via a network. Examples of the preceding network include, but are not limited to, the Internet, an intranet, a local area network, a mobile communication network and a combination thereof.

The transmission apparatus 106 is configured to receive or send data via the network. Examples of such a network may include a wireless network provided by a communication provider of the mobile terminal 10. In one example, the transmission apparatus 106 includes a network interface controller (NIC), which may be connected to other network devices via a base station, thereby communicating with the Internet. In an example, the transmission apparatus 106 may be a radio frequency (RF) module. The RF module is configured to communicate with the Internet in a wireless way.

This embodiment provides an information receiving method executed by the mobile terminal described above. FIG. 3 is a flowchart of the information receiving method according to the embodiment of the present application. As shown in FIG. 3, the method includes steps S202 and S204 described below.

In step S202, at least two pieces of information in the following information are acquired: CSI, first control information or data information; where the first control information includes at least one of: hybrid automatic retransmission request acknowledgement (HARQ-ACK) information or scheduling request (SR) information.

In step S204, the acquired at least two pieces of information are transmitted in a multiplexing manner on a physical channel.

Through the above steps, at least two pieces of the following information are transmitted in the multiplexing manner on a physical channel: the CSI, the first control information or the data information, i.e., transmitting the data information and the second control information (including the CSI and/or the first control information) in the multiplexing manner or transmitting the CSI and the first control information in the multiplexing manner on a physical channel. Therefore, the transmission efficiency of the control information and the data information may be increased, and the problem of low transmission efficiency of the control information and the data information in the related art may be solved.

It should be noted that the above S202 may be omitted, but it is not limited thereto.

It should be noted that the above physical channel may include at least one of: a physical uplink control channel (PUCCH) and a physical uplink shared control channel (PUSCH).

In an embodiment of the present application, in condition that the at least two pieces of information include the CSI or the first control information, the above S204 may be expressed as one of: manner one, performing a jointly encoding transmission on the first control information and all information of the channel state information (CSI) on the physical channel; manner two, performing the jointly encoding transmission on the first control information and first part of information of the channel state information (CSI) on the physical channel, and performing a separately encoding transmission on second part of information of the channel state information (CSI) on the physical channel.

It is to be noted that the first part of information may include at least one of: a rank indicator, a channel quality indicator corresponding to a first transmission codeword, a number of non-zero amplitude coefficients, a reference signal resource indicator, a layer-1 reference signal received power (L1-RSRP), or layer indicator (LI) information. The second part of information includes at least one of: a precoding matrix indicator and a channel quality indicator corresponding to a second transmission codeword.

It is to be noted that the CSI includes at least one of: the PMI, the CQI, the RI, reference signal resource indication information, the L1-RSRP and the LI.

It is to be noted that in response to satisfying at least one of conditions, transmission is performed in the manner one: the CSI transmitted on the physical channel being wideband CSI or partial-band CSI; a feedback mode of the PMI being configured to one of: a wideband PMI, a partial-band PMI or a single PMI; a feedback mode of the CQI being configured to one of: a wideband CQI, a partial-band CQI and a single CQI; transmitting, by a terminal, the first control information by using a physical uplink control channel format 3 (PUCCH format 3) or a physical uplink control channel format 4 (PUCCH format 4); and the terminal being configured to allow the terminal to simultaneously transmit the CSI and the first control information on the physical channel.

It is to be noted that configuring the feedback mode of the PMI to the wideband PMI means that the fed back PMI represents PMI information of an entire CSI feedback bandwidth; configuring the feedback mode of the PMI to the partial-band PMI means that the fed back PMI represents a part of all subbands included in an entire activated downlink bandwidth; configuring the feedback mode of the PMI to the single PMI means that the fed back PMI represents an entire CSI reporting bandwidth reporting a single PMI.

It is to be noted that configuring the feedback mode of the CQI to the wideband PMI means that the fed back PMI represents CQI information of an entire CSI feedback bandwidth; configuring the feedback mode of the CQI to the partial-band CQI means that the fed back CQI represents a part of all subbands included in an entire activated downlink bandwidth; configuring the feedback mode of the CQI to the single PMI means that the fed back CQI represents an entire CSI reporting bandwidth reporting a single CQI.

It is to be noted that in response to satisfying at least one of conditions, transmission is performed in the manner two: transmitting subband CSI on the physical channel; the feedback mode of the PMI being configured to at least one of: a subband PMI or multiple PMIs; the feedback mode of the CQI is configured to at least one of: a subband CQI or multiple CQIs; transmitting, by a terminal, the first control information by using a PUCCH format 3 or a PUCCH format 4; and the terminal being configured to allow the terminal to simultaneously transmit the CSI and the first control information on the physical channel.

It is to be noted that the feedback mode of the PMI being configured to the subband PMI or the multiple PMIs means that when the number of antenna ports corresponding to the PMI is greater than 2, wideband indication information is fed back for the entire CSI feedback bandwidth, and subband indication information is fed back for the subbands of the CSI feedback bandwidth; when the number of antenna ports corresponding to the PMI is equal to 2, the PMI information is fed back for the subbands of the CSI feedback bandwidth.

It is to be noted that the feedback mode of the CQI being configured to a subband CQI or multiple CQIs means that the CQI information corresponding to each transmission codeword is fed back for the subbands of the CSI feedback bandwidth.

The above manner limits conditions for transmission in the manner one and conditions for transmission in the manner two, thereby overcoming defects in the related art that how to transmit the CSI and the first control information is not configured, and the transmission efficiency of the control information is improved.

In an embodiment of the present disclosure, in condition that the second control information includes the CSI and/or the first control information, and the at least two pieces of information include the data information and the second control information, the S204 in which transmitting the second control information and the data information in the multiplexing manner on the physical channel includes: transmitting the second control information and the data information in the same time slot on the physical channel.

It is to be noted that transmitting the second control information and the data information in the same time slot on the physical channel includes: determining a transmission mode for transmitting at least one of the second control information or the data information; and transmitting the second control information and the data information in the same time slot in the multiplexing manner on the physical channel according to the determined transmission mode.

It is to be noted that the transmission mode includes at least one of: a code rate for transmitting the data information not exceeding a data code rate upper limit configured by a base station; an overhead for transmitting the second control information or partial control information of the second control information not exceeding a control information overhead upper limit configured by the base station; matching a code rate for transmitting part or all of control information of the second control information with allocated channel resources; or matching the code rate for transmitting the data information with the allocated channel resources.

It is to be noted that the data code rate upper limit may include at least one of: a data code rate upper limit corresponding to each transmission of the data information; or a data code rate upper limit corresponding to each redundancy version value of the data information.

It is to be noted that the control information overhead upper limit may include at least one of: a control information overhead upper limit corresponding to each transmission of the data information; or a control information overhead upper limit corresponding to each redundancy version value of the data information.

Through determining the data code rate upper limit and the control information overhead upper limit, thus the transmission mode for transmitting the data information and/or the control information is determined, so that the problem of not knowing how to multiplex the data information and the control information in the related art can be solved, and the transmission efficiency of the data information and the control information may be improved, the reliability of the data transmission is increased.

It is to be noted that the method may further include: in condition that a sum of resources required for transmitting the channel state information and the data information is less than the allocated channel resources, adjusting the code rate of part or all of the control information of the second control information to match the allocated channel resources.

It is to be noted that an operation of adjusting the code rate of part or all of the control information of the second control information to match the allocated channel resources may be before, after or at the same time of transmitting the second control information and the data information in the same time slot in the multiplexing manner on the physical channel according to the determined transmission mode, but it is not limited thereto.

It is to be noted that the CSI required to be transmitted is determined by a code rate relationship between the second control information and the data information indicated by the base station and a modulation and coding scheme (MCS) of data, but it is not limited thereto.

In an embodiment of the present disclosure, the method further includes: adjusting the code rate for transmitting the data information to match the allocated channel resources according to at least one of: an overhead of the second control information, a data block size, a modulation and coding scheme of the data information, or a code rate relationship between the data information and the second control information.

An operation of adjusting the code rate for transmitting the data information to match the allocated channel resources may be before, after or at the same time of transmitting the second control information and the data information in the same time slot in the multiplexing manner on the physical channel according to the determined transmission mode, but it is not limited thereto.

It is to be noted that the partial control information of the second control information includes at least one of: the PMI or the CQI corresponding to the second transmission codeword.

It is to be noted that determining the transmission mode for transmitting the second control information and the data information may include: determining the transmission mode according to at least one of configuration signaling of the base station or a pre-defined rule between a terminal and a base station.

Optionally, the above steps may, but may not necessarily, be executed by a terminal.

From the description of the embodiments described above, it will be apparent to those skilled in the art that the methods in the embodiments described above may be implemented by software plus a necessary general-purpose hardware platform, or may of course be implemented by hardware. Based on this understanding, the solution provided by the present application may be embodied in the form of a computer software product. The computer software product is stored in a storage medium (such as a ROM/RAM, a magnetic disk or an optical disk) and includes several instructions for enabling a terminal device (which may be a mobile phone, a computer, a server, a network device, or the like) to execute the method according to each embodiment of the present application.

Embodiment Two

This embodiment provides an information receiving method. FIG. 4 is a flowchart of an information receiving method according to an embodiment of the present disclosure. As shown in FIG. 4, the method includes S302 described below.

In step S302, at least two pieces of information in the following information transmitted in a multiplexing manner on a physical channel are received: CSI, first control information or data information. Where the first control information includes at least one of: hybrid automatic retransmission request acknowledgement (HARQ-ACK) information or scheduling request (SR) information.

Through the above steps, since at least two pieces of the following information are received in the multiplexing manner on a physical channel: the CSI, the first control information or the data information, i.e., transmitting the data information and the second control information (including the CSI and/or the first control information) in the multiplexing manner or transmitting the CSI and the first control information in the multiplexing manner on a physical channel. Therefore, the transmission efficiency of the control information and the data information may be increased, and the problem of low transmission efficiency of the control information and the data information in the related art may be solved.

It should be noted that the above physical channel may include at least one of: a physical uplink control channel (PUCCH) or a physical uplink shared control channel (PUSCH).

In an embodiment of the present disclosure, in condition that the at least two pieces of information include the CSI and the first control information, a transmission mode for transmitting the CSI and the first control information on the physical channel includes at least one of: manner one, performing a jointly encoding transmission on the first control information and all information of the channel state information (CSI) on the physical channel; manner two, performing the jointly encoding transmission on the first control information and first part of information of the channel state information (CSI) on the physical channel, and performing a separately encoding transmission on second part of information of the channel state information (CSI) on the physical channel.

It is to noted that the first part of information may include at least one of: a rank indicator, a channel quality indicator corresponding to a first transmission codeword, a number of non-zero amplitude coefficients, a reference signal resource indicator, a layer-1 reference signal received power, or layer indication information; and the second part of information includes at least one of: a precoding matrix indicator or a channel quality indicator corresponding to a second transmission codeword.

It is to be noted that the CSI includes at least one of: the PMI, the CQI, the RI, reference signal resource indication information, the L1-RSRP or the LI.

It is to be noted that in response to satisfying at least one of conditions, the jointly encoding transmission is performed on the first control information and all information of the channel state information (CSI) on the physical channel: the CSI transmitted on the physical channel being wideband CSI or partial-band CSI; transmitting configuration signaling for indicating that a feedback mode of a PMI is configured to one of: a wideband PMI, a partial-band PMI or a single PMI to a terminal; transmitting configuration signaling for indicating that a feedback mode of a CQI is configured to one of: a wideband CQI, a partial-band CQI or a single CQI to the terminal; transmitting, by a terminal, the first control information by using a physical uplink control channel format 3 (PUCCH format 3) or a physical uplink control channel format 4 (PUCCH format 4); and transmitting configuration signaling for indicating that the terminal is allowed to simultaneously transmit the CSI and the first control information on the physical channel to the terminal.

It is to be noted that configuring the feedback mode of the PMI to the wideband PMI means that the fed back PMI represents PMI information of an entire CSI feedback bandwidth; configuring the feedback mode of the PMI to the partial-band PMI means that the fed back PMI represents a part of all subbands included in an entire activated downlink bandwidth; configuring the feedback mode of the PMI to the single PMI means that the fed back PMI represents an entire CSI reporting bandwidth reporting a single PMI.

It is to be noted that configuring the feedback mode of the CQI to the wideband PMI means that the fed back PMI represents CQI information of an entire CSI feedback bandwidth; configuring the feedback mode of the CQI to the partial-band CQI means that the fed back CQI represents a part of all subbands included in an entire activated downlink bandwidth; configuring the feedback mode of the CQI to the single PMI means that the fed back CQI represents an entire CSI reporting bandwidth reporting a single CQI.

It is to be noted that in response to satisfying at least one of conditions, performing the jointly encoding transmission on the first control information and first part of information of the channel state information (CSI) on the physical channel, and performing the separately encoding transmission on the second part of information of the channel state information (CSI) on the physical channel. The conditions includes: transmitting the subband CSI on the physical channel; transmitting configuration signaling for indicating that a feedback mode of a PMI is configured to at least one of: a subband PMI or multiple PMIs to a terminal; transmitting configuration signaling for indicating that a feedback mode of a CQI is configured to at least one of: a subband CQI or multiple CQIs to a terminal; transmitting, by a terminal, the first control information by using a PUCCH format 3 or a PUCCH format 3; and transmitting configuration signaling for indicating that the terminal is allowed to simultaneously transmit the CSI and the first control information on the physical channel to the terminal.

The feedback mode of the PMI being configured to the subband PMI or the multiple PMIs means that when the number of antenna ports corresponding to the PMI is greater than 2, wideband indication information is fed back for the entire CSI feedback bandwidth, and subband indication information is fed back for the subbands of the CSI feedback bandwidth; when the number of antenna ports corresponding to the PMI is equal to 2, the PMI information is fed back for the subbands of the CSI feedback bandwidth.

It is to be noted that the feedback mode of the CQI being configured to a subband CQI or multiple CQIs means that the CQI information corresponding to each transmission codeword is fed back for the subbands of the CSI feedback bandwidth.

In an embodiment of the present disclosure, in condition that the second control information includes the CSI and/or the first control information, and the at least two pieces of information include the data information and the second control information, the second control information and the data information transmitted in the same time slot in the multiplexing manner on the physical channel is received.

It is to be noted that the method further includes at least one of following steps: transmitting configuration signaling for indicating a transmission mode used for transmitting the second control information and/or the data information to the terminal; and determining the transmission mode used by the second control information and/or the data information according to an predefined rule. This step may be performed before, after, or at the same time of the above S302, but it is not limited thereto.

It is to be noted that the transmission mode satisfies at least one of the following conditions: a code rate for transmitting the data information not exceeding a data code rate upper limit configured by a base station; an overhead for transmitting the second control information or partial control information of the second control information not exceeding a control information overhead upper limit configured by the base station; matching a code rate for transmitting part or all of control information of the second control information with allocated channel resources; and matching the code rate for transmitting the data information with the allocated channel resources.

It is to be noted that the data code rate upper limit includes at least one of: a data code rate upper limit corresponding to each transmission of the data information; and a data code rate upper limit corresponding to each redundancy version value of the data information.

It is to be noted that the control information overhead upper limit includes at least one of: a control information overhead upper limit corresponding to each transmission of the data information; and a control information overhead upper limit corresponding to each redundancy version value of the data information.

It is to be noted that the method may further include: in condition that a sum of resources required for receiving the channel state information and the data information is less than the allocated channel resources, adjusting the code rate of part or all of the control information of the second control information to match the allocated channel resources.

It is to be noted that an execution action of adjusting the code rate of part or all of the control information of the second control information to match the allocated channel resources may be before, after or at the same time of the above S302, but it is not limited thereto.

It is to be noted that the method may further include: adjusting the code rate for receiving the data information to match the allocated channel resources according to at least one of: an overhead of the second control information, a data block size, a modulation and coding scheme of the data information, or a code rate relationship between the data information and the second control information.

It is to be noted that an execution action of adjusting the code rate of the control information to match the allocated channel resources may be before, after or at the same time of the above S302, but it is not limited thereto.

It is to be noted that the partial control information of the second control information includes at least one of: the PMI or the CQI corresponding to the second transmission codeword.

It is to be noted that the above-mentioned method may, but is not limited to, be executed by a network side device, such as a base station.

From the description of the embodiments described above, it will be apparent to those skilled in the art that the methods in the embodiments described above may be implemented by software plus a necessary general-purpose hardware platform, or may of course be implemented by hardware. Based on this understanding, the solution provided by the present application may be embodied in the form of a computer software product. The computer software product is stored in a storage medium (such as a ROM/RAM, a magnetic disk or an optical disk) and includes several instructions for enabling a terminal device (which may be a mobile phone, a computer, a server, a network device, or the like) to execute the method according to each embodiment of the present application.

Embodiment Three

This embodiment further provides an information transmission device. The device is configured to implement the above-mentioned embodiments and preferred embodiments. What has been described will not be repeated. As used below, the term "module" may be software, hardware or a combination thereof capable of implementing predetermined functions. The device in the embodiment described below may be implemented by software, hardware or a combination of software and hardware.

FIG. 5 is a block diagram of a data transmission device according to an embodiment of the present disclosure. As shown in FIG. 5, the device includes: an acquisition module 42 and a transmission module 44.

The acquisition module 42 is configured to acquire at least two pieces of information in the following information: CSI, first control information or data information. Where the first control information includes at least one of: hybrid automatic retransmission request acknowledgement (HARQ-ACK) information or scheduling request (SR) information.

The transmission module 44 is connected to the acquisition module 42 and is configured to transmit the acquired at least two pieces of information in a multiplexing manner on a physical channel.

Through the above device, since at least two pieces of the following information are transmitted in the multiplexing manner on a physical channel: the CSI, the first control information or the data information, i.e., through transmitting the data information and the control information (including the CSI and/or the first control information) in the multiplexing manner or transmitting the CSI and the first control information in the multiplexing manner on a physical channel. Therefore, the transmission efficiency of the control information and the data information may be increased, and the problem of low transmission efficiency of the control information and the data information in the related art may be solved.

It is to be noted that the acquisition module 42 may not exist in the device, that is, the device may only be included in the transmission module 44, but it is not limited thereto.

It is to be noted that the above physical channel may include at least one of: a physical uplink control channel (PUCCH) or a physical uplink shared control channel (PUSCH).

In an embodiment of the present disclosure, in condition that the at least two pieces of information include the CSI and the first control information, the transmission module 44 may transmit the CSI and the first control information in one of the following manners: manner one, performing a jointly encoding transmission on the first control information and all information of the channel state information (CSI) on the physical channel; manner two, performing the jointly encoding transmission on the first control information and first part of information of the channel state information (CSI) on the physical channel, and performing a separately encoding transmission on second part of information of the channel state information (CSI) on the physical channel.

It is to noted that the first part of information may include at least one of: a rank indicator, a channel quality indicator corresponding to a first transmission codeword, a number of non-zero amplitude coefficients, a reference signal resource indicator, a layer-1 reference signal received power, or layer indication information. The second part of information includes at least one of: a precoding matrix indicator or a channel quality indicator corresponding to a second transmission codeword.

It is to be noted that the CSI includes at least one of: the PMI, the CQI, the RI, reference signal resource indication information, the L1-RSRP or the LI.

It is to be noted that in response to satisfying at least one of conditions, the transmission module 44 transmits the CSI and the first control information in the manner one: the CSI transmitted on the physical channel being wideband CSI or partial-band CSI; a feedback mode of the PMI being configured to one of: a wideband PMI, a partial-band PMI or a single PMI; a feedback mode of the CQI being configured to one of: a wideband CQI, a partial-band CQI or a single CQI; transmitting, by a terminal, the first control information by using a physical uplink control channel format 3 (PUCCH format 3) or a physical uplink control channel format 4 (PUCCH format 4); or the terminal being configured to allow the terminal to simultaneously transmit the CSI and the first control information on the physical channel.

It is to be noted that configuring the feedback mode of the PMI to the wideband PMI means that the fed back PMI represents PMI information of an entire CSI feedback bandwidth; configuring the feedback mode of the PMI to the partial-band PMI means that the fed back PMI represents a part of all subbands included in an entire activated downlink bandwidth; configuring the feedback mode of the PMI to the single PMI means that the fed back PMI represents an entire CSI reporting bandwidth reporting a single PMI.

It is to be noted that configuring the feedback mode of the CQI to the wideband PMI means that the fed back PMI represents CQI information of an entire CSI feedback bandwidth; configuring the feedback mode of the CQI to the partial-band CQI means that the fed back CQI represents a part of all subbands included in an entire activated downlink bandwidth; configuring the feedback mode of the CQI to the single PMI means that the fed back CQI represents an entire CSI reporting bandwidth reporting a single CQI.

It is to be noted that in response to satisfying at least one of conditions, the transmission module 44 transmits the CSI and the first control information in the manner two: transmitting subband CSI on the physical channel; the feedback mode of the PMI being configured to at least one of: a subband PMI and multiple PMIs; the feedback mode of the CQI is configured to at least one of: a subband CQI and multiple CQIs; transmitting, by a terminal, the first control information by using a PUCCH format 3 or a PUCCH format 4; or the terminal being configured to allow the terminal to simultaneously transmit the CSI and the first control information on the physical channel.

It is to be noted that the feedback mode of the PMI being configured to the subband PMI or the multiple PMIs means that when the number of antenna ports corresponding to the PMI is greater than 2, wideband indication information is fed back for the entire CSI feedback bandwidth, and subband indication information is fed back for the subbands of the CSI feedback bandwidth; when the number of antenna ports corresponding to the PMI is equal to 2, the PMI information is fed back for the subbands of the CSI feedback bandwidth.

It is to be noted that the feedback mode of the CQI being configured to a subband CQI or multiple CQIs means that the CQI information corresponding to each transmission codeword is fed back for the subbands of the CSI feedback bandwidth.

The above device limits conditions for transmission in the manner one and conditions for transmission in the manner two, thereby overcoming defects in the related art that how to transmit the CSI and the first control information is not set, and the transmission efficiency of the control information is improved.

In an embodiment of the present disclosure, in condition that the at least two pieces of information include the data information and the second control information (including the CSI and/or the first control information), the transmission module 44 is configured to transmit the second control information and the data information in the same time slot in the multiplexing manner on the physical channel.

It is to be noted that the second control information and the data information are transmitted in the same time slot on the physical channel, the device may further include: a determination module, which is configured to determine a transmission mode for transmitting at least one of the second control information or the data information; and the transmission module 44 is connected to the determination module, and is configured to transmit the second control information and the data information in the same time slot in the multiplexing manner on the physical channel according to the determined transmission mode.

It is to be noted that the transmission mode includes at least one of: a code rate for transmitting the data information not exceeding a data code rate upper limit configured by a base station; an overhead for transmitting the second control information or partial control information of the second control information not exceeding a control information overhead upper limit configured by the base station; matching a code rate for transmitting part or all of control information of the second control information with allocated channel resources; or matching the code rate for transmitting the data information with the allocated channel resources.

It is to be noted that the data code rate upper limit may include at least one of: a data code rate upper limit corresponding to each transmission of the data information; or a data code rate upper limit corresponding to each redundancy version value of the data information.

It is to be noted that the control information overhead upper limit may include at least one of: a control information overhead upper limit corresponding to each transmission of the data information; or a control information overhead upper limit corresponding to each redundancy version value of the data information.

Through determining the data code rate upper limit and the control information overhead upper limit, thus the transmission mode for transmitting the data information and/or the control information is determined, so that the problem of not knowing how to multiplex the data information and the control information in the related art can be solved, and the transmission efficiency of the data information and the control information may be improved, the reliability of the data transmission is increased.

It is to be noted that, the second control information and the data information are transmitted in the same time slot in the multiplexing manner on the physical channel according to the determined transmission mode. The above device may further include: an adjustment module, which is connected to the transmission module 44, and is configured to in condition that a sum of resources required for transmitting the channel state information and the data information is less than the allocated channel resources, adjust the code rate of part or all of the control information of the second control information to match the allocated channel resources.

It is to be noted that the CSI required to be transmitted is determined by a code rate relationship between the second control information and the data information indicated by the base station and a modulation and coding scheme (MCS) of data, but it is not limited thereto.

In an embodiment of the present disclosure, the second control information and the data information are transmitted in the same time slot in the multiplexing manner on the physical channel according to the determined transmission mode. The above adjust module is further configured to adjust the code rate for transmitting the data information to match the allocated channel resources according to at least one of: an overhead of the second control information, a data block size, a modulation and coding scheme of the data information, or a code rate relationship between the data information and the second control information.

It is to be noted that the partial control information of the second control information includes at least one of: the PMI and the CQI corresponding to the second transmission codeword.

It is to be noted that the determination module is further configured to determine the transmission mode according to the configuration signaling of the base station and/or the pre-defined rule between the terminal and the base station.

Optionally, the above device may be located in the terminal, but is not limited thereto.

It is to be noted that each module described above may be implemented by software or hardware. Implementation by hardware may, but may not necessarily, be performed in the following manners: the various modules described above are located in a same processor, or multiple modules described above are located in their respective processors in any combination form.

Embodiment Four

According to an embodiment of the present disclosure, an information receiving device is provided. The device includes: a receiving module, which is configured to receive at least two pieces of the following information transmitted in a multiplexing manner on a physical channel: channel state information, first control information or data information; where the first control information includes at least one of: hybrid automatic retransmission request acknowledgement (HARQ-ACK) information or scheduling request (SR) information.

Through the above device, since at least two pieces of the following information are received in the multiplexing manner on a physical channel: the CSI, the first control information and the data information, i.e., transmitting the data information and the second control information (including the CSI and/or the first control information) in the multiplexing manner or transmitting the CSI and the first control information in the multiplexing manner on a physical channel. Therefore, the transmission efficiency of the control information and the data information may be increased, and the problem of low transmission efficiency of the control information and the data information in the related art may be solved.

It is to be noted that the above physical channel may include at least one of: a physical uplink control channel (PUCCH) or a physical uplink shared control channel (PUSCH).

In an embodiment of the present disclosure, in condition that the at least two pieces of information include the CSI and the first control information, a transmission mode for transmitting the CSI and the first control information on the physical channel includes at least one of: manner one, performing a jointly encoding transmission on the first control information and all information of the channel state information (CSI) on the physical channel; manner two, performing the jointly encoding transmission on the first control information and first part of information of the channel state information (CSI) on the physical channel, and performing a separately encoding transmission on second part of information of the channel state information (CSI) on the physical channel.

It is to noted that the first part of information may include at least one of: a rank indicator, a channel quality indicator corresponding to a first transmission codeword, a number of non-zero amplitude coefficients, a reference signal resource indicator, a layer-1 reference signal received power, or layer indication information. The second part of information includes at least one of: a precoding matrix indicator and a channel quality indicator corresponding to a second transmission codeword.

It is to be noted that the CSI includes at least one of: the PMI, the CQI, the RI, reference signal resource indication information, the L1-RSRP or the LI.

It is to be noted that in response to satisfying at least one of conditions, the jointly encoding transmission is performed on the first control information and all information of the channel state information (CSI) on the physical channel. The conditions include: the CSI transmitted on the physical channel being wideband CSI or partial-band CSI; transmitting configuration signaling for indicating that a feedback mode of a PMI is configured to one of: a wideband PMI, a partial-band PMI or a single PMI to a terminal; transmitting configuration signaling for indicating that a feedback mode of a CQI is configured to one of: a wideband CQI, a partial-band CQI and a single CQI to the terminal; transmitting, by a terminal, the first control information by using a physical uplink control channel format 3 (PUCCH format 3) or a physical uplink control channel format 4 (PUCCH format 4); and transmitting configuration signaling for indicating that the terminal is allowed to simultaneously transmit the CSI and the first control information on the physical channel to the terminal.

It is to be noted that configuring the feedback mode of the PMI to the wideband PMI means that the fed back PMI represents PMI information of an entire CSI feedback bandwidth; configuring the feedback mode of the PMI to the partial-band PMI means that the fed back PMI represents a part of all subbands included in an entire activated downlink bandwidth; configuring the feedback mode of the PMI to the single PMI means that the fed back PMI represents an entire CSI reporting bandwidth reporting a single PMI.

It is to be noted that configuring the feedback mode of the CQI to the wideband PMI means that the fed back PMI represents CQI information of an entire CSI feedback bandwidth; configuring the feedback mode of the CQI to the partial-band CQI means that the fed back CQI represents a part of all subbands included in an entire activated downlink bandwidth; configuring the feedback mode of the CQI to the single PMI means that the fed back CQI represents an entire CSI reporting bandwidth reporting a single CQI.

It is to be noted that in response to satisfying at least one of conditions, performing the jointly encoding transmission on the first control information and first part of information of the channel state information (CSI) on the physical channel, and performing the separately encoding transmission on the second part of information of the channel state information (CSI) on the physical channel. The conditions include: transmitting the subband CSI on the physical channel; transmitting configuration signaling for indicating that a feedback mode of a PMI is configured to at least one of: a subband PMI and multiple PMIs to a terminal; transmitting configuration signaling for indicating that a feedback mode of a CQI is configured to at least one of: a subband CQI and multiple CQIs to a terminal; transmitting, by a terminal, the first control information by using a PUCCH format 3 or a PUCCH format 3; and transmitting configuration signaling for indicating that the terminal is allowed to simultaneously transmit the CSI and the first control information on the physical channel to the terminal.

It is to be noted that the feedback mode of the PMI being configured to the subband PMI or the multiple PMIs means that when the number of antenna ports corresponding to the PMI is greater than 2, wideband indication information is fed back for the entire CSI feedback bandwidth, and subband indication information is fed back for the subbands of the CSI feedback bandwidth; when the number of antenna ports corresponding to the PMI is equal to 2, the PMI information is fed back for the subbands of the CSI feedback bandwidth.

It is to be noted that the feedback mode of the CQI being configured to a subband CQI or multiple CQIs means that the CQI information corresponding to each transmission codeword is fed back for the subbands of the CSI feedback bandwidth.

In an embodiment of the present disclosure, in condition that the second control information includes the CSI and/or the first control information, and the at least two pieces of information include the data information and the second control information, the receiving module is configured to receive the second control information and the data information transmitted in the same time slot in the multiplexing manner on the physical channel.

It is to be noted that the device further includes at least one of: a transmission module or a determination module. The transmission module is connected to the receiving module and is configured to transmit configuration signaling for indicating a transmission mode used for transmitting the second control information and/or the data information to the terminal. The determination module is connected to the receiving module and is configured to determine the transmission mode used by the second control information and/or the data information according to a predefined rule.

It is to be noted that the transmission mode satisfies at least one of the following conditions: a code rate for transmitting the data information not exceeding a data code rate upper limit configured by a base station; an overhead for transmitting the second control information or partial control information of the second control information not exceeding a control information overhead upper limit configured by the base station; matching a code rate for transmitting part or all of control information of the second control information with allocated channel resources; or matching the code rate for transmitting the data information with the allocated channel resources.

It is to be noted that the data code rate upper limit includes at least one of: a data code rate upper limit corresponding to each transmission of the data information; or a data code rate upper limit corresponding to each redundancy version value of the data information.

It is to be noted that the control information overhead upper limit includes at least one of: a control information overhead upper limit corresponding to each transmission of the data information; or a control information overhead upper limit corresponding to each redundancy version value of the data information.

It is to be noted that the device may further include: a first adjust module, which is connected to the receiving module, is configured to in condition that a sum of resources required for receiving the channel state information and the data information is less than the allocated channel resources, adjust the code rate of part or all of the control information of the second control information to match the allocated channel resources.

It is to be noted that the device may further include: a second adjust module, which is connected to the receiving module, is configured to adjust the code rate for receiving the data information to match the allocated channel resources according to at least one of: an overhead of the second control information, a data block size, a modulation and coding scheme of the data information, or a code rate relationship between the data information and the second control information.

It is to be noted that the partial control information of the second control information includes at least one of: the PMI or the CQI corresponding to the second transmission codeword.

It is to be noted that the above apparatus may, but may not necessarily, be located in a network side device, such as a base station.

It is to be noted that each module described above may be implemented by software or hardware. Implementation by hardware may, but may not necessarily, be performed in the following manners: the various modules described above are located in a same processor, or multiple modules described above are located in their respective processors in any combination form.

Embodiment Five

An embodiment of the present application provides a computer-readable storage medium. The computer-readable storage medium stores computer programs. The computer programs are configured to, when executed, perform steps in any above method embodiment.

Optionally, in this embodiment, the above-mentioned storage medium may include, but is not limited to, a U disk, a read-only memory (ROM), a random access memory (RAM), a mobile hard disk, a magnetic disk, an optical disk or another medium capable of storing computer programs.

An embodiment of the present application further provides an electronic apparatus. The electronic apparatus includes a memory and a processor. The memory is configured to store a computer program, and the processor is configured to execute the computer program to perform steps of any one of embodiments described above.

Optionally, the electronic apparatus described above may further include a transmission device and an input and output device, where both the transmission device and the input and output device are connected to the processor described above.

Optionally, for examples in the embodiment, reference may be made to the examples described in the embodiments and optional implementation modes described above, and the examples will not be repeated in the embodiment.

To better understand the present disclosure, the present disclosure will be further described below in conjunction with exemplary embodiments.

Exemplary Embodiment One

This exemplary embodiment gives an implementation of control information feedback. The terminal transmits CSI and other UCI on a PUCCH in a same time slot in a multiplexing manner, which may improve the transmission efficiency of the UCI. Other UCI includes HARQ-ACK/SR, and the CSI includes at least one of PMI, CQI, or RI.

In condition that the CSI that the terminal needs to transmit on the PUCCH is wideband CSI or partial-band CSI, if the terminal transmits HARQ-ACK and/or SR in PUCCH format 3 or PUCCH format 4, and the base station allows the terminal to transmit at least one of the HARQ-ACK or the SR as well as the CSI in the PUCCH format 3 or the PUCCH format 4 by configuring signaling, the terminal transmits after performing a joint channel encoding on all CSI in a CSI report as well as at least one of the HARQ-ACK or the SR.

When the base station configures a feedback mode of terminal PMI as wideband PMI, or partial-band PMI, or single PMI, and signaling of a feedback mode of the CQI is configured to be wideband CQI, or partial-band CQI, or single CQI, if the terminal transmits HARQ-ACK and/or SR in PUCCH format 3 or PUCCH format 4, and the base station allows the terminal to transmit at least one of HARQ-ACK or SR and CSI on the PUCCH format 3 or format 4 by configuring signaling at the same time, the terminal transmits after performing the joint channel encoding on all CSI in the CSI report as well as at least one of the HARQ-ACK or the SR.

When the terminal needs to transmit subband CSI on a PUCCH, if the terminal transmits the HARQ-ACK and/or the SR in the PUCCH format 3 or the PUCCH format 4, and the base station allows the terminal to transmit at least one of the HARQ-ACK or the SR as well as the CSI in the PUCCH format 3 or the PUCCH format 4 by configuring signaling, the terminal transmits after performing the joint channel encoding on first part of CSI in the CSI report as well as at least one of the HARQ-ACK or the SR and performing an independent encoding transmission on second part of CSI in the CSI report. When the CSI is configured to first type of CSI, the first part of CSI includes at least: an RI and a CQI of a first transmission codeword; the second part of CSI includes at least a PMI, and if necessary, includes a CQI of a second transmission codeword. When the CSI is configured to second type of CSI, the first part of CSI includes at least: the RI, the CQI of the first transmission codeword, and the number of non-zero amplitude coefficients in the PMI. The second part of CSI includes at least the PMI.

When the base station configures the feedback mode of the terminal PMI to be subband PMI or multiple PMIs, and/or, the signaling of the feedback mode of the CQI is configured to subband CQI or multiple CQIs, if the terminal transmits the HARQ-ACK and/or SR in the PUCCH format 3 or the PUCCH format 4, and the base station allows the terminal to transmit at least one of HARQ-ACK or the SR and CSI on the PUCCH format 3 or the PUCCH format 4 through configuration signaling at the same time, and the terminal transmits after performing the joint channel encoding on first part of CSI in the CSI report as well as at least one of the HARQ-ACK or the SR and performing the independent encoding transmission on second part of CSI in the CSI report. When the CSI is configured to first type of CSI, the first part of CSI includes at least: an RI and a CQI of a first transmission codeword; the second part of CSI includes at least a PMI, and if necessary, includes a CQI of a second transmission codeword.

When the CSI is configured to second type of CSI, the first part of CSI includes at least: the RI, the CQI of the first transmission codeword, and the number of non-zero amplitude coefficients in the PMI. The second part of CSI includes at least the PMI.

Exemplary Embodiment Two

This exemplary embodiment gives an implementation of control information and data transmission. A terminal multiplexes data and an UCI on a PUSCH in a same time slot to improve the performance of an uplink transmission. Multiplexing transmission modes are mode 1, mode 2 and mode 3.

Mode one: after calculating the CSI, the terminal obtains the total number of UCI bits, and obtains the total number of resource elements (REs) required by the UCI according to values of $\beta_{offset}$ of the UCI and an MCS of the PUSCH configured by a base station. The terminal uses the total number of REs of the PUSCH allocated by the base station minus the total number of REs of the UCI to obtain the total number of REs required for the data, and adjusts a code rate of an uplink data transmission to match the total number of data channel resources. FIG. 6 is a schematic diagram of adjusting the data code rate provided by the embodiment two of the present disclosure.

Figure 7:
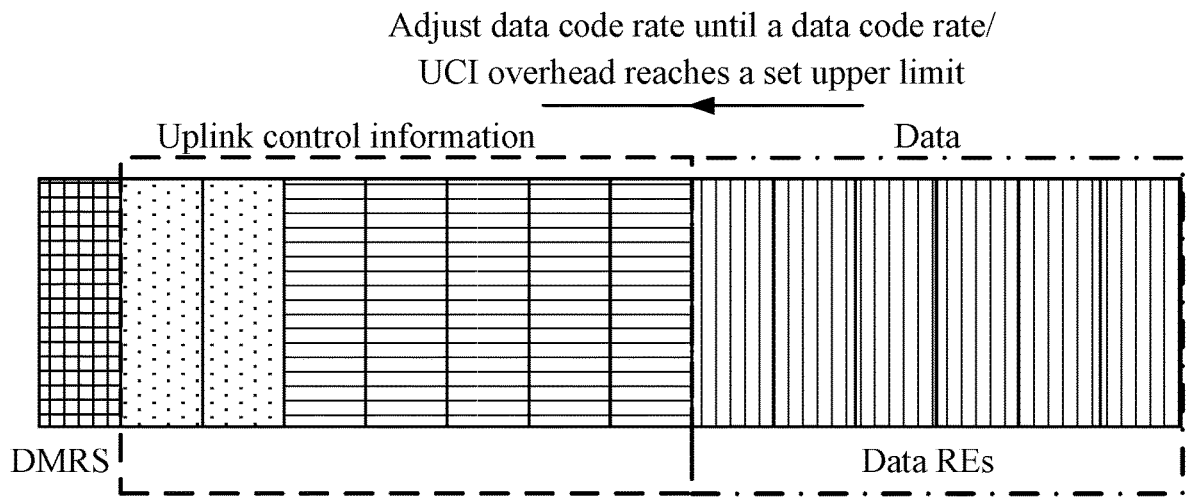
FIG. 7 is a schematic diagram of conditionally adjusting a data code rate according to exemplary embodiment two of the present application.

Mode two: when transmitted uplink data is a service with a higher priority, for example, a URLLC service, the reliability of the uplink data transmission needs to be guaranteed. The uplink data may be transmitted according to at least one of following sub-modes. FIG. 7 is a schematic diagram of conditionally adjusting the data code rate according to the exemplary embodiment two of the present disclosure. As shown in FIG. 7, the mode two includes a sub-mode one and a sub-mode two.

Sub-mode one: the base station configures a code rate upper limit of a multiplexed data transmission for the terminal. A code rate of the transmitted data does not exceed this upper limit. When a code rate of the uplink data transmission is adjusted to reach the upper limit, the code rate is no longer increased for rate matching.

Optionally, the base station may configure multiple code rate upper limits for a total of K transmissions of the same data. A k-th transmission corresponds to an m-th code rate upper limit. When the data is first transmitted and retransmitted, the terminal determines the corresponding code rate upper limit according to this data transmission being the k-th transmission. For example, K transmissions are configured to M groups, a m-th group includes $K_m$ transmissions, and the base station configures M code rate upper limits for transmissions of M groups, the m-th code rate upper limit is applied to $K_m$ transmissions in the m-th group when $K_m$ transmissions multiplex the UCI.

Optionally, the base station may configure multiple upper code rate limits for different redundancy version (RV) values of the same data transmission. When each transmission needs to be multiplexed with the UCI, the terminal determines the corresponding code rate upper limit according to a value of the agreed RV or an indicator of the base station.

Optionally, the base station configures a data transmission code rate upper limit multiplexed with the UCI for each transmission block; another mode is that the base station configures data transmission code rate upper limit multiplexed with the UCI for all transmission blocks, and a maximum value of all transmission block code rates is less than or equal to this code rate upper limit.

Sub-mode two: the base station configures an overhead upper limit of the multiplexed UCI for the terminal. An overhead of the UCI may represent the number of UCI bits, and/or the number of REs occupied by the UCI. The overhead of the UCI transmitted and multiplexed with the data does not exceed the upper limit. When the code rate of the uplink data transmission is adjusted so that the overhead of the UCI reaches the upper limit, the code rate is no longer increased for rate matching.

Optionally, the base station may configure multiple overhead upper limits of the UCI multiplexed by a total of K transmissions of the same data for a total of K transmissions of the same data. The k-th transmission corresponds to the m-th code rate upper limit. When the data is first transmitted and retransmitted, the terminal determines the corresponding overhead upper limit of the UCI multiplexed by the K-th transmission according to this data transmission being the k-th transmission; for example, K transmissions are configured to M groups, the m-th group includes $K_m$ transmissions, and the base station configures M overhead upper limits of the UCI for transmissions of M groups, the m-th overhead upper limit is applied to $K_m$ transmissions in the m-th group when $K_m$ transmissions multiplex the UCI.

Optionally, the base station may configure multiple overhead upper limits of the UCI multiplexed with different RV values of the same data transmission, and when each data transmission needs to be multiplexed with the UCI, the terminal determines the corresponding overhead upper limit of the UCI multiplexed with the data according to the value of the agreed RV or the indicator of the base station.

Mode three: the terminal adjusts a code rate of at least part of the control information to match allocated channel resources according to at least one of an MCS of the data, a control information overhead or a size of the data block required to be transmitted. According to the data MCS indicated by the base station and a relationship between the UCI and the data code rate, if the sum of resources required for transmitting the CSI and the uplink data is less than the allocated channel resources, the code rate of at least part of the control information is adjusted to match the allocated channel resources, for example, a code rate of the second part of CSI included in the CSI required to be transmitted.

Figure 8:
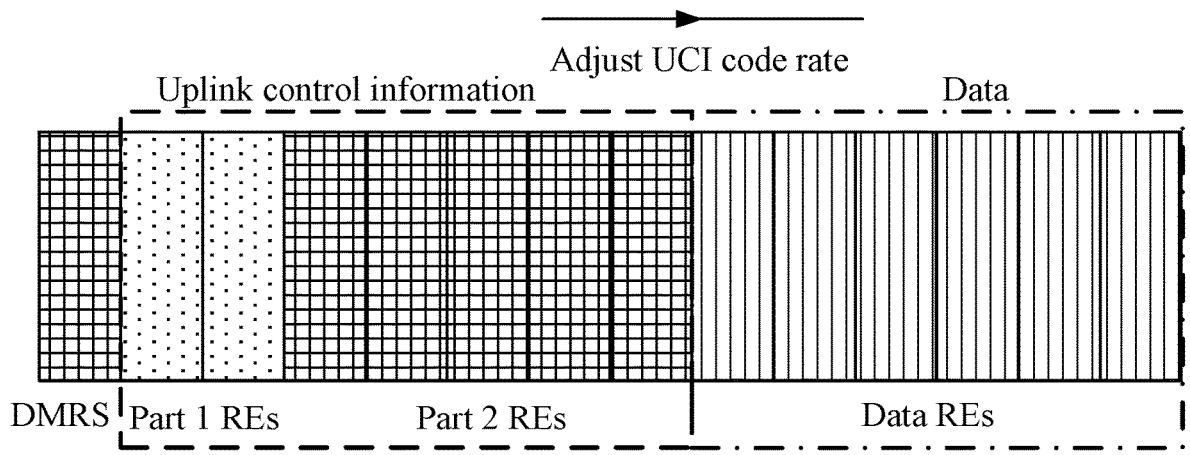
FIG. 8 is a schematic diagram of adjusting UCI code rate according to exemplary embodiment two of the present application.

For example, a case of mode three is shown in FIG. 8, FIG. 8 is a schematic diagram of adjusting the code rate of the UCI according to the exemplary embodiment two of the present disclosure. The total number of REs of the PUSCH configured by the base station is N, and the total number of REs of the data obtained from the MCS and the transmission block size (TBS) of the data is N_data. According to the relationship βoffset between the data code rate and the code rate corresponding to the first part and the number of bits in the first part, the total number of REs N_Part1 in the first part of the CSI may be obtained, and the number of bits calculated in the second part of the CSI is B_part2. the total number of REs required to completely transmit Part2 at an original code rate may be obtained according to the $\beta_{offset}$ and the MCS:

$$N\_Part2\_original \propto B\_part2/(MCS/\beta_{offset}\_part2)$$

N_Part2_original represents the total number of REs required to completely transmit Part2 at the original code rate.

If N_Part2_original<(N−N_data−N_Part1), the code rate of part 2 of the CSI is reduced to $$C\_part2 \propto B\_part2/(N-N\_data-N\_part1)$$

C_part2 represents the code rate after the code rate of part 2 of the CSI is reduced.

Optionally, the base station may instruct the terminal to adopt at least one of the above-mentioned multiple modes through the higher layer signaling or the physical layer signaling. For example, the base station may perform such signaling indicator through different requirements of uplink and downlink services.

Exemplary Embodiment Three

This exemplary embodiment gives an implementation of channel state information feedback. A base station allocates reference signal (RS) resources for a CSI measurement feedback to a terminal, such as CSI-RS resources. These resources include at least one of: a first RS resource set for channel measurement or a second RS resource set for interference measurement. The second RS resource set includes at least one of: an interference measurement resource based on a zero-power RS or an interference measurement resource based on a non-zero-power RS. When performing the CSI calculation, the terminal performs a channel measurement according to resources in the selected first RS resource set, and performs an interference measurement according to one or more second RS resources corresponding to the first RS resource in the second RS resource set. The terminal determines a corresponding relationship between RS resources in the first RS resource set and RS resources in the second RS resource set according to at least one of a first type mode, a second type mode, and a third type mode.

In the first type mode: the base station notifies the terminal of each resource in the first RS resource set as well as which RS resource in the second RS resource set corresponds to each resource in the first RS resource set respectively through higher layer signaling and/or physical layer signaling. For example, the base station may include ID information indicating one or more first RS resource sets corresponding to each second RS resource set in configuration information of each resource included by the second RS resource set or in configuration information in the second RS resource set; or include ID information indicating one or more second RS resource sets corresponding to each first RS resource set in configuration information of each resource included by the first RS resource set or in configuration information in the first RS resource set.

In the second type mode: the terminal acquires the correspondence between the RS resources in the first RS resource set and the RS resources in the second RS resource set by a pre-defined rule. The first RS resource set includes M RS resources $\{C_1, \ldots, C_M\}$, and the second RS resource set includes N RS resources $\{I_1, \ldots, I_N\}$, wherein Ci corresponds to one or more second RS resources $I_{i1}$, $I_{i2}, \ldots, I_{iK}$, $I_{i1}, I_{i2}, \ldots, I_{iK}$ is several consecutive RS resources in $I_1, \ldots I_N$. For example, an m-th RS resource in the first RS resource set corresponds to (m−1)K+1 to mK-th RS resources in the second RS resource set, K is an integer greater than or equal to 1, and may be a pre-defined constant, or determined by the configuration signaling of the base station.

If a value of K is determined according to signaling, the signaling may be an explicit signal, or the value of K may be determined according to a ratio between the number of resources included in the configured second RS resource set and the number of resources included in the configured first RS resource set. For example, a ratio of N and M is a real number X, and then the value of K is X or the smallest integer which is larger than X If the ratio of N and M is less than the value of K (that is, the value of K is an integer after rounding up X), then the M-th RS resource in the first RS resource set corresponds to the (M−1)K+1 to N-th RS resources.

Optionally, the order in which $\{C_1, \ldots, C_M\}$ and $\{I_1, \ldots, I_N\}$ are arranged may be an order arranged in the corresponding RS set, or an order arranged according to the corresponding resource ID size.

In the third type mode: the first RS resource set includes M RS resources $\{C_1, \ldots, C_M\}$, and the second RS resource set includes N RS resources $\{I_1, \ldots, I_N\}$. When configuring the first and/or second RS resource set, the base station configures the resources included in the first and/or second RS resource set in a grouping manner.

For example, the first RS resource set is divided into A groups, and the second RS resource set is divided into B groups, where $1 \leq A \leq M$ and $1 \leq B \leq N$. The base station separately configures first RS resources included in each group of the A groups of the first RS resources, and/or the second RS resource included in each group of the B groups of the second RS resources. The first RS resource in an a-th group corresponds to the second RS resource in a b-th group, and a correspondence between such groups is configured by the base station or predefined. If A=B is pre-defined, the a-th group corresponds to the second RS resource in the b-th group; or if A=B=M is pre-defined, an m-th first RS resource corresponds to the second RS resource in an m-th group; or if A=B=N, an n-th second RS resource corresponds to the first RS resource in an n-th group.

Exemplary Embodiment Four

This exemplary embodiment gives an implementation of CSI feedback. When a CSI feedback includes a CRI and/or a L1-RSRP, a terminal may measure and report the CRI and/or the L1-RSRP based on a triggered aperiodic reference signal. A base station triggers one or more reference signal resource sets through higher layer or physical layer signaling, and selects to report the CRI and/or the L1-RSRP based on the measurement on these reference signal resource sets. The base station triggers M reference signal resource sets, and an m-th reference signal resource set includes Km reference signal resources. There are $\Sigma_{m=1}^{M} K_m = K$ reference signal resources, modes of the base station feeding back the CRI include at least one of a mode 1, a mode 2 and a mode 3.

Mode one: encoding and reporting are performed according to an order of selected reference signal resources in K reference signal resources.

Optionally, the order may be an order of the reference signal resource set and a configuration of reference signal resources in each set, or an order of ID sizes of K reference signal resources. Optionally, a feedback bit width of each CRI is $\lceil \log_2(K) \rceil$ bits.

Mode two: the reported CRI includes two parts, which are indication information of the reference signal resource set where the reference signal resource is located, for example, the indication information indicates that the reference signal resource set is information of an m-th set of all measured reference signal resource sets; and indication information that the reference signal resource is in a kth reference signal resource of the reference signal resource set in which the reference signal resource is located.

Optionally, the k-th reference signal resource and/or the m-th reference signal resource set are arranged in at least one of the following orders: an order configured according to the reference signal resource set, an order of the reference signal resource configured in the reference signal resource set, an order of the reference signal resource set ID size, and an order of the reference signal resource ID size in the reference signal resource set.

Optionally, the feedback bit width of each reference signal resource set indication information is $\lceil \log_2(M) \rceil$ bits, and the feedback bit width of each reference signal resource indication information corresponding to an m-th reference information resource set is $\lceil \log_2(K_m) \rceil$. Alternatively, the feedback bit width of each reference signal resource indication information in the m-th reference signal resource set is $(\lceil \log_2(M) \rceil + \lceil \log_2(K_m) \rceil)$ bits.

Mode three: the reported reference signal resource is the k-th reference signal resource in the m-th reference signal resource set, and the reported CRI is calculated according to the formula which is a function of k and m. For example, the reported CRI indicates information of a $(\Sigma_{i=0}^{m-1} K_i+k)$-th resource among totally K resources, where m=1, . . . , M; k=1, . . . , K; and $K_0=0$. In addition, when the CRI is x, the k-th reference signal resource in the m-th reference signal resource set is indicated, where m satisfies $\Sigma_{i=0}^{m-1} K_i<x+1$, $\Sigma_{i=0}^{m} K_i \geq x+1$, k indicates $x+1-\Sigma_{i=1}^{m-1} K_i$, where m=1, . . . , M; k=1, . . . , K; $K_0=0$.

Optionally, the k-th reference signal resource and/or the m-th reference signal resource set are arranged in at least one of the following orders: an order configured according to the reference signal resource set, an order of the reference signal resource configured in the reference signal resource set, an order of the reference signal resource set ID size, and an order of the reference signal resource ID size in the reference signal resource set.

Optionally, a feedback bit width of each CRI is $\lceil \log_2 (\Sigma_{m=1}^{M} K_m) \rceil$ bits.

In addition, the triggered M reference signal resource sets, each set includes information indicating a time difference between a time slot for transmitting the reference signal and a time slot for the triggering signaling. When the M reference signal resource sets are triggered, the time difference indicated by each reference signal set may be different. For example, the time difference indicated by the M sets is M consecutive integers. In this case, each reference signal set may be represented by ID information of a time slot, for example, a 1st, a 2nd, . . . , an M-th reference signal resource set corresponds to a respectively one of a $s_1$-th, a $s_2$-th, . . . , an $s_M$-th time slot after the triggering signaling. In the methods for feeding back the CRI, parameters 1, . . . , M, etc. representing the reference signal resource set ID may be replaced with parameters such as $s_1, s_2, . . . , s_M$, etc.

Apparently, it is to be understood by those skilled in the art that each of the above-mentioned modules or steps of the embodiments of the present invention may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatuses, so that the modules or steps may be stored in a storage apparatus and executed by the computing apparatuses. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present application is not limited to any particular combination of hardware and software.

What is claimed is:

1. A method, comprising:
   determining a transmission mode for transmitting channel state information (CSI), first control information, and data information in a time slot in at least one of a plurality of multiplexing manners on a physical channel, the transmission mode satisfying a code rate upper limit configured by a base station;
   determining, from the plurality of multiplexing manners, a multiplexing manner for transmitting the CSI, the first control information, and the data information on the physical channel in accordance with the transmission mode, wherein the plurality of multiplexing manners comprises:
   (a) a first manner including performing a jointly encoded transmission on the first control information and all information of the CSI in response to the CSI transmitted on the physical channel including at least one of wideband CSI or partial-band CSI, and
   (b) a second manner including (i) performing the jointly encoding transmission on the first control information and first part of information of the CSI on the physical channel and (ii) performing a separately encoding transmission on second part of information of the channel state information CSI on the physical channel, in response to the CSI transmitted on the physical channel including subband CSI; and
   transmitting the CSI, the first control information, and the data information in the time slot in the multiplexing manner on the physical channel in accordance with the determined transmission mode;
   wherein the first control information comprises at least one of: hybrid automatic retransmission request acknowledgement (HARQ-ACK) information or scheduling request (SR) information.

2. The method of claim 1, wherein in response to satisfying at least one of conditions, the jointly encoding transmission is performed on the first control information and all information of the channel state information (CSI) on the physical channel, wherein the conditions comprises:
   a feedback mode indicated by a precoding matrix being configured to one of: a wideband precoding matrix indicator, a partial-band precoding matrix indicator or a single precoding matrix indicator;
   a feedback mode of a channel quality indicator being configured to one of: a wideband channel quality indicator, a partial-band channel quality indicator and a single channel quality indicator;
   transmitting, by a terminal, the first control information by using a physical uplink control channel format 3 or a physical uplink control channel format 4; and
   the terminal being configured to allow the terminal to simultaneously transmit the channel state information and the first control information on the physical channel.

3. The method of claim 1, wherein in response to satisfying at least one of conditions, the jointly encoding transmission is performed on the first control information and the first part of information of the channel state information (CSI) on the physical channel, and the separately encoding transmission is performed on the second part of information of the channel state information (CSI) on the physical channel, wherein the conditions comprise:
   a feedback mode indicated by the precoding matrix being configured to at least one of: a subband precoding matrix indicator or multiple precoding matrix indicators;
   a feedback mode of the channel quality indicator is configured to at least one of: a subband channel quality indicator or multiple channel quality indicators;
   transmitting, by a terminal, the first control information by using a physical uplink control channel format 3 or a physical uplink control channel format 4; and
   the terminal being configured to allow the terminal to simultaneously transmit the channel state information and the first control information on the physical channel.

4. The method of claim 1, wherein
   the first part of the information of the CSI comprises at least one of: a rank indicator, a channel quality indicator corresponding to a first transmission codeword, a number of non-zero amplitude coefficients, a reference signal resource indicator, a layer-1 reference signal received power, or layer indication information; and the second part of information comprises at least one of: a precoding matrix indicator and a channel quality indicator corresponding to a second transmission codeword.

5. The method of claim 1, wherein the channel state information comprises at least one of: the precoding matrix indicator, the channel quality indicator, the rank indicator, reference signal resource indication information, the layer-1 reference signal received power, or the layer indication information.

6. The method of claim 1, wherein second control information comprises at least one of the channel state information or the first control information.

7. The method of claim 6, wherein the transmission mode satisfies at least one of the following conditions:
a code rate for transmitting the data information not exceeding the code rate upper limit configured by the base station;
an overhead for transmitting the second control information or partial control information of the second control information not exceeding a control information overhead upper limit configured by the base station;
matching a code rate for transmitting part or all of control information of the second control information with allocated channel resources; or
matching a code rate for transmitting the data information with the allocated channel resources.

8. The method of claim 7, wherein the code rate upper limit comprises at least one of: a data code rate upper limit corresponding to each transmission of the data information; or a data code rate upper limit corresponding to each redundancy version value of the data information.

9. The method of claim 7, wherein the control information overhead upper limit comprises at least one of:
a control information overhead upper limit corresponding to each transmission of the data information; or a control information overhead upper limit corresponding to each redundancy version value of the data information.

10. The method of claim 7, further comprising:
in condition that a sum of resources required for transmitting the channel state information and the data information is less than the allocated channel resources, adjusting the code rate of part or all of the control information of the second control information to match the allocated channel resources.

11. The method of claim 7, further comprising:
adjusting the code rate for transmitting the data information to match the allocated channel resources according to at least one of: an overhead of the second control information, a data block size, a modulation and coding scheme of the data information, or a code rate relationship between the data information and the second control information.

12. The method of claim 7, wherein the partial control information of the second control information comprises at least one of: a precoding matrix indicator or a channel quality indicator corresponding to a second transmission codeword.

13. The method of claim 6, wherein determining the transmission mode for transmitting the second control information and the data information comprises: determining the transmission mode according to at least one of: configuration signaling of the base station or a predefined rule between a terminal and the base station.

14. A method, comprising:
receiving channel state information (CSI), first control information, and data information transmitted in a multiplexing manner on a physical channel in accordance with a transmission mode, the transmission mode satisfying a code rate upper limit configured by a base station, wherein the multiplexing manner is determined from the plurality of multiplexing manners, the plurality of multiplexing manners comprising:
(a) a first manner including performing a jointly encoded transmission on the first control information and all information of the CSI in response to the CSI transmitted on the physical channel including at least one of wideband CSI or partial-band CSI, and
(b) a second manner including (i) performing the jointly encoding transmission on the first control information and first part of information of the CSI on the physical channel and (ii) performing a separately encoding transmission on second part of information of the channel state information CSI on the physical channel, in response to the CSI transmitted on the physical channel including subband CSI;
wherein the first control information comprises at least one of: hybrid automatic retransmission request acknowledgement (HARQ-ACK) information or scheduling request (SR) information.

15. The method of claim 14, wherein in response to satisfying at least one of conditions, the jointly encoding transmission is performed on the first control information and all information of the channel state information (CSI) on the physical channel, wherein the conditions comprises:
transmitting configuration signaling for indicating that a feedback mode of a precoding matrix indicator is configured to one of: a wideband precoding matrix indicator, a partial-band precoding matrix indicator and a single precoding matrix indicator to a terminal;
transmitting configuration signaling for indicating that a feedback mode of a channel quality indicator is configured to one of: a wideband channel quality indicator, a partial-band channel quality indicator and a single channel quality indicator to the terminal;
transmitting, by a terminal, the first control information by using a physical uplink control channel format 3 or a physical uplink control channel format 4; and
transmitting configuration signaling for indicating that the terminal is allowed to simultaneously transmit the channel state information and the first control information on the physical channel to the terminal.

16. An apparatus, comprising:
at least one processor configured to:
determine a transmission mode for transmitting channel state information (CSI), first control information, and data information in a time slot in at least one of a plurality of multiplexing manners on a physical channel, the transmission mode satisfying a code rate upper limit configured by a base station;
determine, from a plurality of multiplexing manners, a multiplexing manner for transmitting the CSI, the first control information, and the data information on the physical channel in accordance with the transmission mode, wherein the plurality of multiplexing manners comprises:
(a) a first manner including performing a jointly encoded transmission on the first control information and all information of the CSI in response to the CSI transmitted on the physical channel including at least one of wideband CSI or partial-band CSI, and (b) a second manner including (i) performing the jointly encoding transmission on the first control information and first part of information of the CSI on the physical channel and (ii) performing a separately encoding transmission on second part of information of the channel state information CSI on the physical channel, in response to the CSI transmitted on the physical channel including subband CSI; and transmit the CSI, the first control information, and the data information in time slot in the multiplexing manner on the physical channel in accordance with the determined transmission mode;

wherein the first control information comprises at least one of: hybrid automatic retransmission request acknowledgement (HARQ-ACK) information or scheduling request (SR) information.

17. An apparatus, comprising:

at least one processor configured to:
  receive channel state information (CSI), first control information, and data information transmitted in accordance with a multiplexing manners on a physical channel in accordance with a transmission mode, the transmission mode satisfying a code rate upper limit configured by a base station, wherein the multiplexing manner is determined from the plurality of multiplexing manners, the plurality of multiplexing manners comprising:

(a) a first manner including performing a jointly encoded transmission on the first control information and all information of the CSI in response to the CSI transmitted on the physical channel including at least one of wideband CSI or partial-band CSI, and (b) a second manner including (i) performing the jointly encoding transmission on the first control information and first part of information of the CSI on the physical channel and (ii) performing a separately encoding transmission on second part of information of the channel state information CSI on the physical channel, in response to the CSI transmitted on the physical channel including subband CSI;

wherein the first control information comprises at least one of: hybrid automatic retransmission request acknowledgement (HARQ-ACK) information or scheduling request (SR) information.

\* \* \* \* \*

UNITED STATES PATENT AND TRADEMARK OFFICE
CERTIFICATE OF CORRECTION

| | |
|---|---|
| PATENT NO. | : 11,558,094 B2 |
| APPLICATION NO. | : 16/925658 |
| DATED | : January 17, 2023 |
| INVENTOR(S) | : Hao Wu et al. |

It is certified that error appears in the above-identified patent and that said Letters Patent is hereby corrected as shown below:

In the Claims

In Claim 1, Column 24, Line 11, please delete "channel state information"

In Claim 14, Column 26, Line 22, please delete "channel state information"

In Claim 16, Column 27, Line 8, please delete "channel state information"

In Claim 17, Column 27, Line 23, please delete "manners" and insert -- manner --

In Claim 17, Column 28, Lines 16-17, please delete "channel state information"

Signed and Sealed this
Fourteenth Day of March, 2023

Katherine Kelly Vidal
*Director of the United States Patent and Trademark Office*